(12) United States Patent
Buettner et al.

(10) Patent No.: US 8,335,573 B2
(45) Date of Patent: Dec. 18, 2012

(54) SAFETY-ORIENTED CONTROL SYSTEM

(75) Inventors: Holger Buettner, Berlin (DE); Jens Sachs, Petershagen (DE)

(73) Assignee: Beckhoff Automation GmbH, Verl (DE)

( * ) Notice: Subject to any disclaimer, the term of this patent is extended or adjusted under 35 U.S.C. 154(b) by 438 days.

(21) Appl. No.: 11/583,360

(22) Filed: Oct. 18, 2006

(65) Prior Publication Data

US 2007/0124115 A1 May 31, 2007

Related U.S. Application Data

(63) Continuation of application No. PCT/EP2005/003853, filed on Apr. 13, 2005.

(30) Foreign Application Priority Data

Apr. 19, 2004 (DE) .......................... 10 2004 018 857

(51) Int. Cl.
G05B 19/18 (2006.01)
G05B 11/01 (2006.01)
G06F 15/16 (2006.01)

(52) U.S. Cl. .................. 700/21; 700/7; 700/19; 700/24; 709/230; 709/245

(58) Field of Classification Search ................... 700/18, 700/21, 26, 79, 7, 19, 20, 23; 709/208, 230, 709/246, 249
See application file for complete search history.

(56) References Cited

U.S. PATENT DOCUMENTS

| | | | |
|---|---|---|---|
| 6,711,698 B1 | 3/2004 | Marbach et al. | |
| 7,107,358 B2 * | 9/2006 | Vasko et al. | 709/249 |
| 2004/0049672 A1 | 3/2004 | Nollet et al. | |
| 2004/0210326 A1 | 10/2004 | Muneta et al. | |
| 2004/0210620 A1 * | 10/2004 | Muneta et al. | 709/200 |
| 2004/0260408 A1 * | 12/2004 | Scott et al. | 700/20 |
| 2005/0055111 A1 * | 3/2005 | Law et al. | 700/83 |
| 2006/0271709 A1 * | 11/2006 | Vasko et al. | 709/249 |
| 2007/0213853 A1 * | 9/2007 | Glanzer et al. | 700/79 |

FOREIGN PATENT DOCUMENTS

| | | |
|---|---|---|
| DE | 102 11 941 A | 10/2003 |
| EP | 1 043 640 | 10/2000 |

(Continued)

OTHER PUBLICATIONS

Sterle, L.A., "Considerations in Applying Programmable Controllers in Safety System Applications", *Advances in Instrumentation and Control, Instrument Society of America*, Research Triangle Park, U.S., Bd. 45, Nr. Part 3, Jan. 1990, pp. 1295-1304.

(Continued)

*Primary Examiner* — Albert Decady
*Assistant Examiner* — Darrin Dunn
(74) *Attorney, Agent, or Firm* — Dorsey & Whitney LLP (57) ABSTRACT

For the purpose of controlling safety functions as part of a system controller which is not oriented to safety functions in an automation system, the invention provides safety modules having a sound functionality and provides a safety protocol which transmits data in the form of safety messages, wherein input and output parameters from each safety module are encapsulated by the safety protocol, and the individual safety modules are logically combined with one another in terms of data and flow by means of a data transmission link in line with the system's safety functions which are to be controlled, the data interchange taking place between the safety modules on the basis of the safety protocol.

26 Claims, 5 Drawing Sheets

FOREIGN PATENT DOCUMENTS

| | | |
|---|---|---|
| EP | 1 043 640 A | 10/2000 |
| JP | 11-161321 | 6/1999 |
| JP | 2003181900 | 7/2003 |
| WO | WO 02/50637 A | 6/2002 |
| WO | WO 02/097543 A1 | 12/2002 |
| WO | WO 03/023561 A2 | 3/2003 |

OTHER PUBLICATIONS

Schiffer, V. "Ableger gezogen" *iee 45,* 2000, No. 4, p. 56, 58.

"Urbi et orbi" *iee 45,* 2000, No. 9, p. 48, 50, 52.

"Echtzeit-Hurde genommen" *iee 45,* 2000, No. 9, p. 55, 56,58.

Grundsatz fur die Prufung and Zertifizierung von "Bussystemen fur die Ubertragung sicherheltsrelevanter Nachrichten", Hauptverband der gewerblichen Berufsgenossenschaften, Fachausschuss "Elektrotechnik"; edition May 2002, p. 1-34.

Profibus Specification, PROFISafe—Profile for Safety Technology, v. 1.30, Jun. 2004.

Wolfhard Lawrenz, CAN Controller Area Network, Grundlagen und Praxis, 2. Auflage, 1997.

Opposition for co-pending European Application No. 05733921.0, Mar. 20, 2009.

European Patent Office Action. European Patent Application No. 05 733 921.0. Issued Jan. 13, 2012 39 pages.

Embedded Machine on FPGA. A Reconfigurable System based on Kahn Process Networks. Master's Thesis. Roman Plessl. Computer Engineering and Networks Laboratory and Swiss Federal Institute of Technology Zurich. Apr. 28, 2004. 18 pages.

EN 61131. Retrived from http://de.wikipedia.org/wiki/EN_61131 on Oct. 28, 2010. 3 pages.

Erste Schritte mit CoDeSys. Smart Software Solutions GmbH. Mar. 5, 2004. 15 pages.

Funktionsbausteinprache. Retrived from http://de.wikipedia.org/wiki/Funktionsbausteinsprache on Oct. 25, 2010 1 page.

IEC 61131-3. Retrived from http://en.wikipedia.org/wiki/IEC_61131-3. Oct. 28, 2010. 3 pages.

Profibus. PROFIsafe—Profile for Safety Technology. Version 1.20. 32 pages Oct. 2002 72 pages.

Grötsch, Eberhard "SPS 1 Speicherprogrammierbare Steuerungen." Oldenbourg. 10 pages.

Grötsch et al."SPS 2 Speicherprogrammierbare Steuerungen Band 2. Programmbeispiele und Produkte." Oldenbourg. 24 pages.

Japanese Patent Office Action. Japanese Patent Application No. 2007-508782. Feb. 17, 2009. 10 pages.

* cited by examiner

```
PH2 -> PS4
  OutParam1
  OutParam2
  F_Control
  F_SeqNo
  F_CRC2

PS4 -> PH2
  F_Status
  F_SeqNo
  F_CRC2
```

SAFETY-ORIENTED CONTROL SYSTEM

CROSS-REFERENCE TO RELATED APPLICATION(S)

This application is a continuation of International Patent Application No. PCT/EP2005/003853, filed on Apr. 13, 2005, which claims priority to German Application No. 10 2004 018 857.2, filed on Apr. 19, 2004, the contents of both of which are hereby incorporated in their entirety by reference herein.

BACKGROUND OF THE INVENTION

1. Field of the Invention

The invention relates to a method and an apparatus for controlling safety functions as part of a system controller which is not oriented to safety functions, for use in automation systems.

2. Description of the Related Art

An essential demand on an automation computer for controlling machines is safety and reliability. In particular, there must be the assurance that, even if it fails, the automation system presents no risk to humans and the environment. Automation systems therefore normally operate on the basis of what is known as the failsafe principle, according to which the automation system changes to a safe state in the event of important components failing. The task of the automation computer when executing safety-related control functions on the basis of the failsafe principle is to process the process signals for executing the control functions in current and uncorrupted form and to display a safe process state to the actuators of the automation system at all times.

In automation control, the number of safety-related control functions is normally much smaller than the number of non-safety-related control functions, however, which are used for maintaining the regular operation of the automation system. To ensure that the functionalities of safety-related control functions are not influenced by non-safety-related control functions in the automation computer, the safety-related control functions are conventionally combined in a standalone safety program which is isolated from the non-safety-related control functions. To achieve complete isolation of safety-related and non-safety-related functions, the safety programs are normally executed on a standalone automation computer which is often also connected to the emergency off switches, light barriers and other components ensuring machine safety by means of dedicated wiring.

To reduce the hardware complexity in automation computers, there are also controllers for automation systems, such as Siemens' Simatic system, known in which a safety program and non-safety-related functions can be implemented on the same hardware components. In this context, the conventional automation computer for executing the non-safety-related functions can be expanded by a safety program. However, expanding the automation computer by means of the safety program is possible only with a precisely stipulated configuration and data processing environment, STEP7-Runtime in the case of the Simatic system.

WO 02/50637 also discloses a method which allows non-relevant control functions to be linked into safety programs using a safe program shell. However, the restriction also applies here that integrating safety programs and non-safety-related control programs on a common automation computer is admissible only in a precisely defined program environment, but may not be done in an arbitrary operating system environment, e.g. the Windows operating programs.

In addition, a general demand on safety programs operating on the basis of the failsafe principle is to keep down the probability of a program error as far as possible. An objective when developing safety programs is therefore to reduce the complexity of the safety program as much as possible, but this cannot readily be ensured in the case of the conventional closed safety programs, which are intended to be isolated from non-safety-related control functions. This applies particularly when the safety programs are intended to be used in programmable controllers.

SUMMARY OF THE INVENTION

The invention refers to a method and an apparatus for controlling safety functions as part of a system controller which is not oriented to safety functions, in which the safety program combining the safety functions is distinguished by low complexity and can be executed in any nonsafe program environment, without errors in the control of non-safety-related control functions resulting in an error when controlling safety functions.

According to a one aspect of the invention a method controls safety functions as part of a system controller which is not oriented to safety functions, in which safety modules having a sound functionality are provided and a safety protocol which transmits data in the form of safety messages is provided. Input parameters and the output parameter from each safety module are encapsulated by the safety protocol. The individual safety modules are logically combined with one another in terms of data and flow by means of a data transmission link in line with the system's safety functions which are to be controlled. The data interchange takes place between the safety modules on the basis of the safety protocol.

According to another aspect of the invention a method controls safety functions as part of a system controller which is not oriented to safety functions, in which safety modules having a sound functionality are provided and a safety protocol which transmits data in the form of safety messages is provided. Input parameters and the output parameter from each safety module are encapsulated by the safety protocol. The individual safety modules are logically combined with one another in terms of data and flow by means of a data transmission link. The data interchange takes place between the safety modules on the basis of the safety protocol. In an implementation step of the safety protocol the logic combination of the safety modules in terms of data and flow is stipulated in line with the system's safety functions which are to be controlled, each safety module being assigned a unique identifier.

According to another aspect of the invention an apparatus controls safety functions in an automation system as part of a system controller which is not oriented to safety functions, comprising safety modules having a sound functionality and comprising a safety protocol which transmits data in the form of safety messages. Input parameters and the output parameter from the safety modules are encapsulated by the safety protocol. A combinational logic unit is provided which logically combines the safety modules with the other safety modules in terms of data and flow in line with the system's safety functions which are to be controlled.

According to another aspect of the invention an apparatus controls safety functions in an automation system as part of a system controller which is not oriented to safety functions, comprising safety modules having a sound functionality which are logically combined with one another in terms of data and flow by means of a data transmission link and comprising a safety protocol which transmits data in the form of safety messages. Input parameters and the output parameter from the safety modules are encapsulated by the safety protocol. A logic tool is provided in the safety protocol which is designed to stipulate, in an implementation step of the safety protocol, the safety modules' logic combination in terms of data and flow in line with the system's safety functions which are to be controlled and to assign a unique identifier to each safety module.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
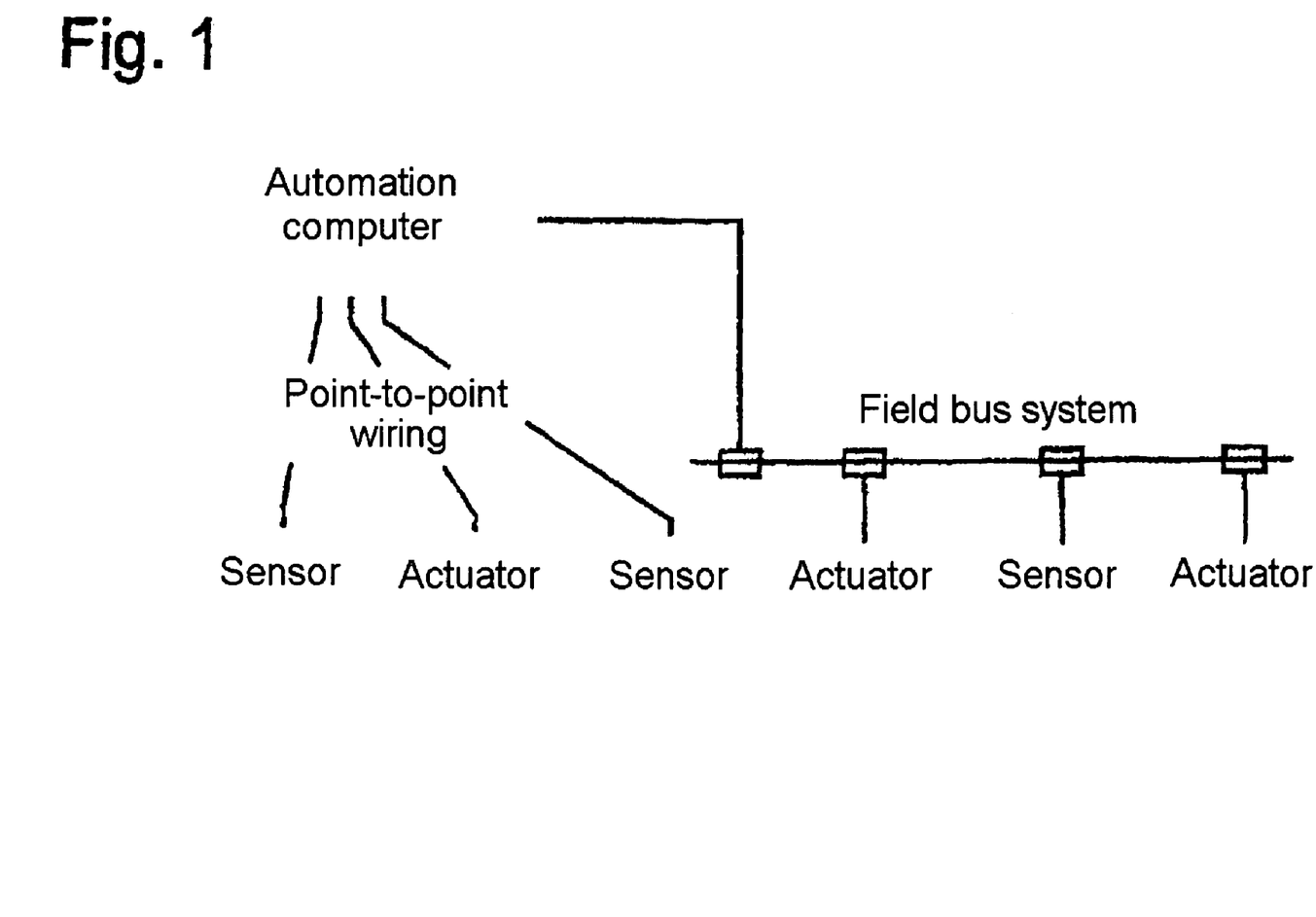
FIG. 1 shows the basic structure of an automation system.

FIG. 1 shows the basic structure of an automation system. An automation computer may be connected to sensors and actuators by a point-to-point connection or a bus system in order to output process signals for the actuators automatically using a control program on the basis of process signals captured by the sensors. An important demand on the control program executed by the automation computer, besides real-time capability, i.e. the demand for the automation computer to output the process signals to the actuators within the stipulated process times, is to ensure that in the event of the automation system failing there is no threat to humans and the environment. Besides normal control functions, the automation computer therefore also needs to perform safety functions which, in the event of important components of the automation system failing, ensure that the automation system automatically changes to a safe state on the basis of what is known as the failsafe principle. Such safety functions are emergency off circuits in machines, for example.

The number of safety functions in a control program running on the automation computer is normally less than the number of non-safety-related control functions. When performing the safety functions, it is necessary to ensure that they are executed soundly. In particular, it should be ensured that the non-safety-related control functions do not influence the functionality of the safety functions. This also applies particularly when the program environment in which the safety functions are executed on the control computer, that is to say the automation computer's operating program, is not subject to any kind of safety standards.

For the purpose of controlling safety functions as part of an automation controller which is not oriented to safety functions, the invention forms safety modules having sound functionality, wherein the input and output parameters from each safety module are encapsulated by a safety protocol which transmits data in the form of safety messages, and the individual safety modules are logically combined with one another in terms of data and flow by means of a data transmission link in line with the automation system's safety functions which are to be controlled, the data interchange taking place between the safety modules on the basis of the safety protocol.

In line with the invention, the safety program for executing the safety functions is therefore divided into small functional units with a limited scope of functions, which reduces the development complexity for the safety program. To ensure a sound functionality for safety programs, the probability of a program error needs to be kept below a safety threshold. Only then are safety programs also certified. This requirement can be achieved more easily and less expensively, in comparison with a closed safety program, using the inventive safety modules, which have only a limited functionality and hence limited program complexity. The safety modules ensure sound passage of data and are designed such that the output independently outputs a data value which signals a safe state when an incorrect or no data value is received at the input of the safety module.

The inventive safety protocol ensures that the input and output parameters from each safety module are encapsulated and thus cannot be corrupted. In addition, the safety protocol ensures safe data interchange between the individual safety modules in the form of safety messages, the safety protocol logically combining the safety modules with one another in terms of data and flow in line with the safety functions which are to be controlled. In this way, the safety functions can be performed in a nonsafe program environment which also contains non-safety-related control functions. The automation computer can thus be put onto any operating program, which itself does not need to meet the safety engineering demands on a failsafe program. In this context, the safety protocol protects the data which is to be transmitted such that corruption during the data transmission is identified with a level of probability which is sufficient for safety engineering. The inventive safety protocol can be used here to transmit the data between the safety modules by any data transmission route. In addition, the safety protocol allows the safety modules to be logically combined in any way, which is advantageous particularly in the case of programmable controllers, since the diversity of possible logic combinations which is then required is no longer reflected in increased complexity of the safety program.

For the purpose of safe transmission of the safety messages, the safety protocol contains mechanisms against the following types of error: repetition, loss, insertion, incorrect data sequence, corruption of the data, data delay, coupling between safety-related and non-safety-related data and incorrect addressing. The safety measures used in this context are a data frame for the safety messages which executes the following safety measures: consecutive numbering of the safety messages, monitoring of a time overshoot when transmitting the safety messages, authenticity monitoring for the safety messages, preferably using passwords, and protection of the data integrity of the safety messages using a checksum.

Figure 2:
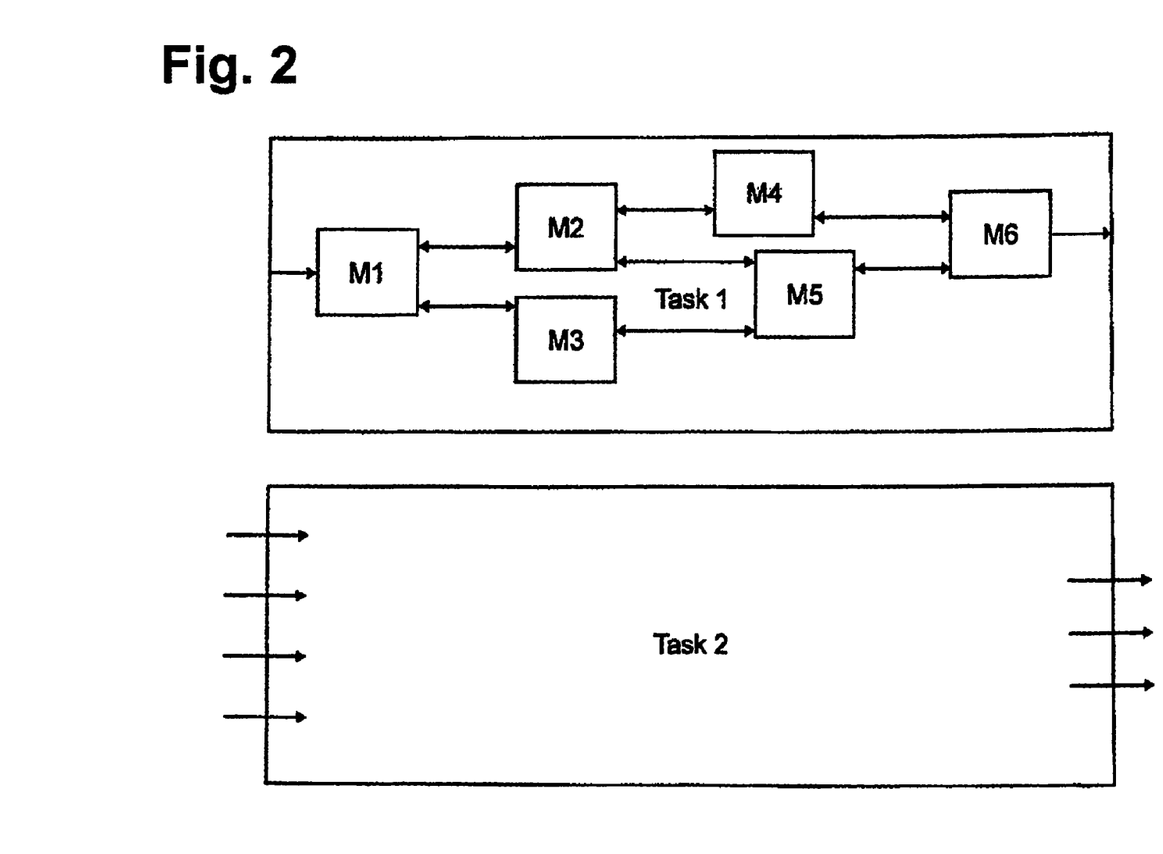
FIG. 2 shows a control program for an automation system, comprising safety-related control functions and non-safety-related control functions.

FIG. 2 shows a possible control program for an automation computer which contains both safety functions and non-safety-related control tasks. In this case, the safety-related control functions are combined in a task 1 and the non-safety-related functions are combined in a task 2. The data interchange between the automation computer and the connected actuators and sensors takes place cyclically and deterministically in this context, the data for the safety modules being handled in prioritized fashion, so that in a transmission cycle all the data for the safety modules are transferred first and then the data for non-safety functions are transferred.

In the embodiments shown, the safety task 1 is divided into six safety modules M1 to M6 which are encapsulated on their own and between which there is bidirectional data interchange—identified by bidirectional arrows—using the safety protocol. In this case, the safety module M1 forms the input interface for process signals with safety-related data from the sensors, and the safety module M6 forms the output interface for process signals for controlling the failsafe state of the connected actuators. In this case, the six safety modules M1 to M6 are logically combined with one another such that the desired safety functions of the automation system are performed. The control task 2 contains all non-safety-related control functions, the data interchange taking place unidirectionally, with an interface for inputting process signals from the sensors and an interface for outputting process signals to the actuators. The control program with the safety-related and non-safety related control functions may in this case be executed in any operating system environment, which itself is not subject to any safety demands, that is to say also does not need to be certified.

The safety modules M1 to M6 shown in FIG. 2 are combined in the operating system, preferably in a library, and can be addressed by other control programs using function calls. The complexity of the safety modules may differ in this case, e.g. may be a Boolean combinational logic function or a simple control function. The individual safety modules ensure safe functionality of the data passage in this context, depending on the prescribed safety demand. The safe communication between the safety modules is achieved by the safety protocol. To this end, all input and output parameters from the safety modules are encapsulated by the safety protocol.

Figure 3:
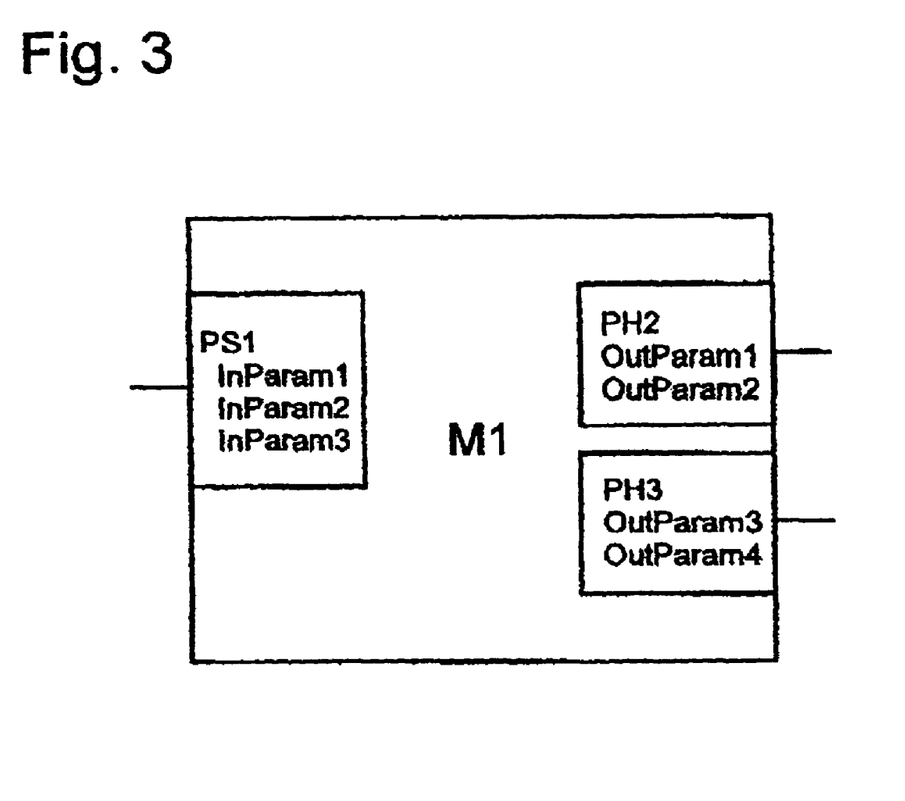
FIG. 3 shows an inventive safety module in a functional block diagram.
Figure 4:
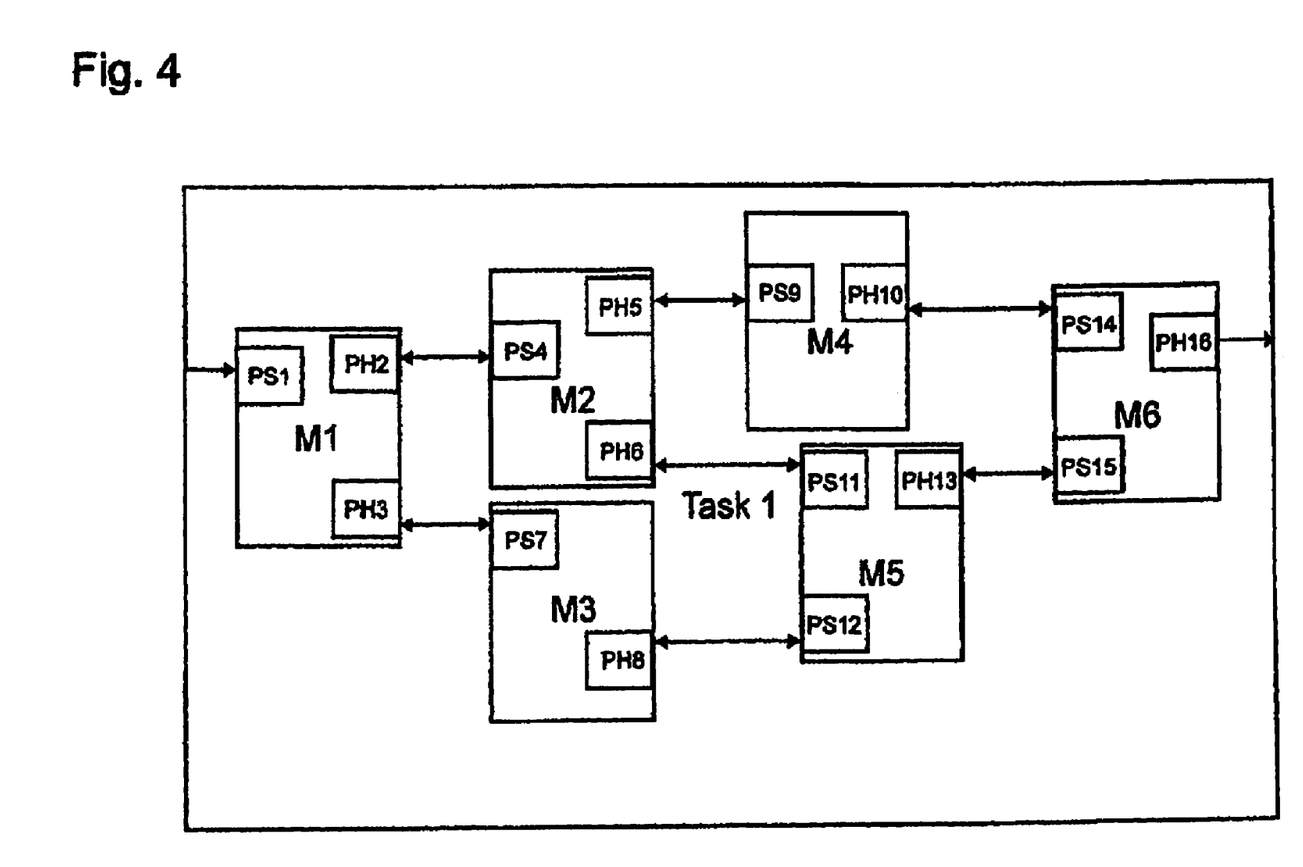
FIG. 4 shows a dataflow and an execution plan for the safety-related control functions in the control program shown in FIG. 2.
Figure 5:
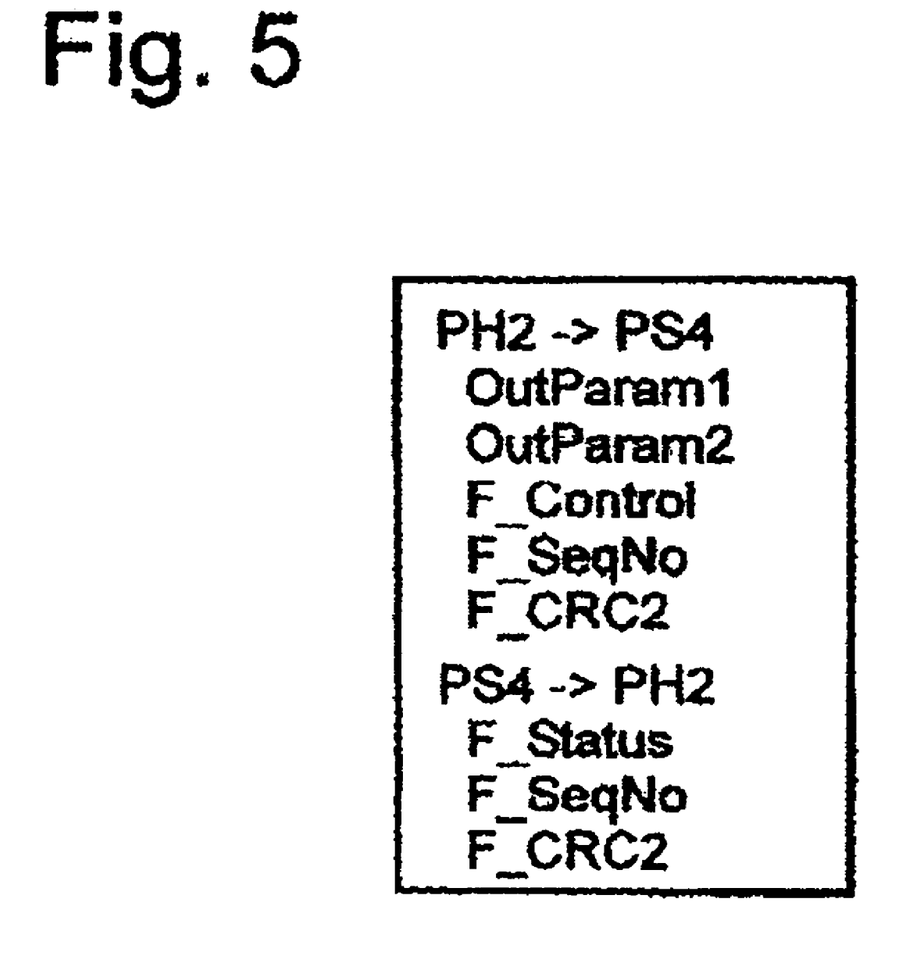
FIG. 5 shows a data interface for logically combining the safety modules M2 and M4 shown in FIG. 4.

FIG. 3 shows the safety module M1 shown in FIG. 2 with an input interface and two output interfaces, wherein the input interface comprises three parameters and the two output interfaces respectively comprise two parameters which are respectively encapsulated by the safety protocol. The safety protocol logically combines the encapsulated input and output interfaces, as FIG. 4 shows, on the basis of the required safety standards. If the safety program is being executed on single-processor hardware, for example, then the safety protocol ensures double execution of the safety program's function sequence within the respective safety module. The flow of data and the execution sequence of the control task 1 in this case takes place from the left in FIG. 4, the safety module M1, which receives the process data from the sensors, to the right, to the safety module M6, which outputs the process signals indicating the safe state to the actuators. A data interface for logically combining the safety modules M2 and M4 is also shown in FIG. 5. In line with the safety protocol, the data to be transmitted from the safety module M2 to the safety module M4 are encapsulated with a control bit F_Control, a sequence number F_SeqNo and a checksum F_CRC2. So that the safety module M2 can establish whether the data interface is sound, the safety module M4 returns a status bit F_Status, the sequence number F_SeqNo and the checksum F_CRC2 to the safety module M2. The upstream safety module M2 thus specifies for the downstream safety module M4 the sequence number F_SeqNo and the checksum F_CRC2, which need to be returned following receipt. In this case, the data interchange between the two safety modules M2 and M4 needs to take place within a predetermined time in which particularly the sequence number needs to be reported back to the safety module M2 by the safety module M4. In the next cycle, it is then incremented by 1 by the safety module M2 in order to control the data interchange. Through this practice, it can be reliably established whether correct data transmission has taken place between the safety modules M2 and M4 and/or whether the order of execution has been carried out correctly.

Furthermore, the safety protocol stipulates that the checksum is different for every connection between two safety modules, in order to identify any reversal of data. To this end, each safety interface receives a unique identifier which is included in the calculation of the checksum. The identifiers for the safety modules are in this case prescribed by a logic tool in the safety protocol, which also stipulates the flowchart for the data transmission between the safety modules. The safety protocol's logic tool ensures that no identifier for the safety modules is allocated twice, and that in an implementation step the logic combination of the safety modules in terms of data and flow is prescribed for the safety modules and the associated identifier is stored. The implementation by the logic tool is preferably protected by a password in this case.

The invention allows safety functions to be easily controlled by virtue of the safety functions being able to be split over a multiplicity of safety modules which are distinguished by low complexity. It is then only necessary to consider the individual safety modules or their functionality on their own from a safety engineering point of view and to certify them. Safe communication between the safety modules is assured by the safety protocol, which encapsulates the input and output parameters from the safety modules and ensures safe data interchange. This safety protocol also stipulates the flowchart for the safety functions between the safety modules in an initialization phase.

For the purpose of controlling safety functions as part of a system controller which is not oriented to safety functions in an automation system, the invention provides safety modules having a sound functionality and provides a safety protocol which transmits data in the form of safety messages, wherein input and output parameters from each safety module are encapsulated by the safety module, and the individual safety modules are logically combined with one another in terms of data and flow by means of a data transmission link in line with the system's safety functions which are to be controlled, the data interchange taking place between the safety modules on the basis of the safety protocol.

The invention allows a safety program operating on the basis of the failsafe principle, for controlling an automation system, to be split into small safety modules whose program complexity is limited, which reduces the probability of a program error. These safety modules can also be executed in a nonsafe control environment, i.e. on an automation computer with an arbitrary operating program for executing non-safety-related control functions, without errors which occur in the case of the non-safety-related control functions resulting in an error when controlling the safety functions. In addition, the non-safety-related control functions or the control programs which are used to execute these control functions can be changed at any time without impairing the functionality of the encapsulated safety modules.

The encapsulation of the input and output parameters from each safety module by the safety protocol, and the data interchange between the individual safety modules on the basis of the safety protocol, ensure that corruption of data during data transmission between the safety modules, e.g. on account of a fault, is identified with sufficient probability for safety engineering, so that the data transmitted between the safety modules can be used as safe process data for executing safety functions on the basis of the failsafe principle. The use of a safety protocol and the encapsulation of the safety modules allow data transmission to be executed between two safety modules by any transmission route, that is to say in any operating system environment, without additional safety demands needing to be made on this operating system.

For the purpose of transmitting the safety messages the safety protocol contains mechanisms against the following types of error in the data which are to be transmitted: repetition, loss, insertion, incorrect data sequence, data corruption, data delay, coupling between safety-related and non-safety-related data and incorrect addressing. In this way, the safety protocol can identify all faults or corruptions in the data interchange between the individual safety modules with the probability which is required for safety engineering. In this context, preferred safety measures executed by the safety protocol, using a data frame for the safety messages, are the following measures: consecutive numbering of the safety messages, time monitoring for the safety message transmission, authenticity monitoring for the safety message transmission and protection of the data integrity of the safety messages using a checksum.

The safety functions are implemented through logic combination of the input and output parameters from the safety modules. This ensures that any safety functions can be executed using small safety modules, which are distinguished by reduced complexity and hence low susceptibility to error.

The sound functionality of the safety modules is ensured by virtue of a data value independently signaling the safe state at the output when an incorrect or no data value is received at the input. This practice safeguards the failsafe principle when executing the safety function.

Improved safety for the data interchange between the safety modules is also achieved by virtue of the input and output parameters from each safety module being stipulated as part of an initialization operation and being stored in a form protected against unauthorized access in the relevant safety module. This practice ensures reliable encapsulation of the safety modules.

A further increase in safety is achieved by virtue of the data transmission on the data transmission link taking place cyclically and deterministically, the data for the safety modules being handled in prioritized fashion, so that in a transmission cycle all the data for the safety modules are transmitted first and then data for non-safety functions are transmitted.

The preceding description only describes advantageous exemplary embodiments of the invention. The features disclosed therein and the claims and the drawings can, therefore, be essential for the realization of the invention in its various embodiments, both individually and in any combination. While the foregoing is directed to embodiments of the present invention, other and further embodiments of this invention may be devised without departing from the basic scope of the invention, the scope of the present invention being determined by the claims that follow.

What is claimed is:

1. A method for controlling safety functions in a system controller which executes safety functions forming a safety task as well as non-safety-related functions forming a non-safety related control task, said tasks being performed by the controller, results of both tasks being process signals for actuators, and both tasks formed by means of an operating program which is not safety certified in which safety modules each having a sound functionality are provided and a safety protocol which transmits data in a form of safety messages is provided, wherein input parameters and output parameters from each safety module are encapsulated by the safety protocol, and the individual safety modules are logically combined with one another in terms of data and flow by means of a data transmission link in line with the safety task which is to be controlled, a data interchange taking place between the safety modules on the basis of the safety protocol.

2. The method of claim 1, wherein for the purpose of transmitting the safety messages the safety protocol contains mechanisms against the following types of error in the transmitted data: repetition, loss, insertion, incorrect data sequence, data corruption, data delay, coupling between safety-related and non-safety-related data and incorrect addressing.

3. The method of claim 2, wherein the safety protocol uses a data frame for the safety messages to execute the following safety measures: consecutive numbering of the safety messages, time monitoring for the safety message transmission, authenticity monitoring for the safety message transmission and protection of the data integrity of the safety messages using a checksum.

4. A method of claim 1, wherein the safety functions are implemented through logic combination of the input and output parameters from the safety modules.

5. The method of claim 1, wherein the sound functionality of the safety module ensures that a data value independently signals the safe state at the output when an incorrect or no data value is received at the input.

6. The method of claim 1, wherein the input parameters and the output parameter from each safety module are stipulated as part of an initialization operation and are stored in a form protected against unauthorized access in the relevant safety module.

7. The method of claim 1, wherein the safety protocol is designed for bidirectional data transmission in the form of safety messages between the safety modules.

8. The method of claim 1, wherein the safety modules are designed for sound data passage.

9. The method of claim 1, wherein a first safety module is used as an input interface for process signals and a second safety module is used as an output interface for process signals.

10. The method of claim 1, wherein the data transmission takes place cyclically and deterministically, the data for the safety modules being handled in prioritized fashion, so that in a transmission cycle all the data for the safety modules are transferred first and then data for non-safety functions are transferred.

11. A method for controlling safety functions in a system controller which executes safety functions forming a safety task as well as non-safety-related functions forming a non-safety related control task, said tasks being performed by the controller, results of both tasks being process signals for actuators, and both tasks formed by means of an operating program which is not safety certified in which safety modules each having a sound functionality are provided and a safety protocol which transmits data in a form of safety messages is provided, wherein input parameters and output parameters from each safety module are encapsulated by the safety protocol, and the individual safety modules are logically combined with one another in terms of data and flow by means of a data transmission link, a data interchange taking place between the safety modules on a basis of the safety protocol, wherein in an implementation step of the safety protocol the logic combination of the safety modules in terms of data and flow is stipulated in line with the safety task which is to be controlled, each safety module being assigned a unique identifier.

12. The method of claim 11, wherein for the purpose of transmitting the safety messages the safety protocol contains mechanisms against the following types of error in the transmitted data: repetition, loss, insertion, incorrect data sequence, data corruption, data delay, coupling between safety-related and non-safety-related data and incorrect addressing.

13. The method of claim 12, wherein the safety protocol uses a data frame for the safety messages to execute the following safety measures: consecutive numbering of the safety messages, time monitoring for the safety message transmission, authenticity monitoring for the safety message transmission and protection of the data integrity of the safety messages using a checksum.

14. The method of claim 11, wherein the safety functions are implemented through logic combination of the input and output parameters from the safety modules.

15. The method of claim 11, wherein the sound functionality of the safety module ensures that a data value independently signals the safe state at the output when an incorrect or no data value is received at the input.

16. The method of claim 11, wherein the input parameters and the output parameter from each safety module are stipulated as part of an initialization operation and are stored in a form protected against unauthorized access in the relevant safety module.

17. The method of claim 11, wherein the safety protocol is designed for bidirectional data transmission in the form of safety messages between the safety modules.

18. The method of claim 11, wherein the safety modules are designed for sound data passage.

19. The method of claim 11, wherein a first safety module is used as an input interface for process signals and a second safety module is used as an output interface for process signals.

20. The method of claim 11, wherein the data transmission takes place cyclically and deterministically, the data for the safety modules being handled in form prioritized fashion, so that in a transmission cycle all the data for the safety modules are transferred first and then data for non-safety functions are transferred.

21. An automation system comprising a system controller which executes safety functions forming a safety task as well as non-safety-related functions forming a non-safety related control task, said tasks being performed by the controller, results of both tasks being process signals for actuators, and both tasks formed by using an operating program which is not safety certified, the system controller comprising safety modules each having a sound functionality and comprising a safety protocol which transmits data in a form of safety messages, in which input parameters and output parameters from the safety modules are encapsulated by the safety protocol, and has a combinational logic unit which logically combines the safety modules with other safety modules in terms of data and flow in line with the safety task which is to be controlled.

22. The apparatus of claim 21, wherein for the purpose of transmitting the safety messages the safety protocol contains mechanisms against the following types of error in the transmitted data: repetition, loss, insertion, incorrect data sequence, data corruption, data delay, coupling between safety-related and non-safety-related data and incorrect addressing.

23. The apparatus of claim 22, wherein the safety protocol uses a data frame for the safety messages to execute the following safety measures: consecutive numbering of the safety messages, time monitoring for the safety message transmission, authenticity monitoring for the safety message transmission and protection of the data integrity of the safety messages using a checksum.

24. An automation system comprising a system controller which executes safety functions forming a safety task as well as non-safety-related functions forming a non-safety related control task, said tasks being performed by the controller, results of both tasks being process signals for actuators, and both tasks formed by means of an operating program which is not safety certified, the system controller comprising safety modules each having a sound functionality which are logically combined with one another in terms of data and flow by means of a data transmission link and comprising a safety protocol which transmits data in a form of safety messages, in which input parameters and output parameters from the safety modules are encapsulated by the safety protocol, wherein a logic tool in the safety protocol which is designed to stipulate, in an implementation step of the safety protocol, the safety modules' logic combination in terms of data and flow in line with the safety task which is to be controlled and to assign a unique identifier to each safety module.

25. The apparatus of claim 24, wherein for the purpose of transmitting the safety messages the safety protocol contains mechanisms against the following types of error in the transmitted data: repetition, loss, insertion, incorrect data sequence, data corruption, data delay, coupling between safety-related and non-safety-related data and incorrect addressing.

26. The apparatus of claim 25, wherein the safety protocol uses a data frame for the safety messages to execute the following safety measures: consecutive numbering of the safety messages, time monitoring for the safety message transmission, authenticity monitoring for the safety message transmission and protection of the data integrity of the safety messages using a checksum.

* * * * *